US011118039B2

(12) United States Patent
Rousseaux et al.

(10) Patent No.: US 11,118,039 B2
(45) Date of Patent: Sep. 14, 2021

(54) CONDUCTIVE ARTICLES PRODUCED FROM A COMPOSITE MATERIAL AND PROCESS TO PRODUCE SUCH ARTICLES

(71) Applicant: TOTAL RESEARCH & TECHNOLOGY FELUY, Seneffe (BE)

(72) Inventors: Dimitri Rousseaux, Nivelles (BE); Olivier Lhost, Havre (BE); Nabil Mellouky, Seneffe (BE); Pascal Navez, Fontaine l'Evêque (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 16/753,938

(22) PCT Filed: Oct. 4, 2018

(86) PCT No.: PCT/EP2018/077043
§ 371 (c)(1),
(2) Date: Apr. 6, 2020

(87) PCT Pub. No.: WO2019/068825
PCT Pub. Date: Apr. 11, 2019

(65) Prior Publication Data
US 2020/0308379 A1   Oct. 1, 2020

(30) Foreign Application Priority Data
Oct. 6, 2017   (EP) .................................... 17195318

(51) Int. Cl.
| | | |
|---|---|---|
| *H01B 1/24* | (2006.01) | |
| *C08L 23/00* | (2006.01) | |
| *B29C 48/00* | (2019.01) | |
| *C08L 23/06* | (2006.01) | |
| *B29B 7/90* | (2006.01) | |
| *B29C 45/00* | (2006.01) | |
| *B29C 49/00* | (2006.01) | |
| *C08J 3/22* | (2006.01) | |
| *H01B 1/12* | (2006.01) | |
| *H01B 13/00* | (2006.01) | |
| *B29K 507/04* | (2006.01) | |

(52) U.S. Cl.
CPC ............... *C08L 23/06* (2013.01); *B29B 7/90* (2013.01); *B29C 45/0001* (2013.01); *B29C 48/022* (2019.02); *B29C 49/0005* (2013.01); *C08J 3/226* (2013.01); *H01B 1/125* (2013.01); *H01B 1/24* (2013.01); *H01B 13/0036* (2013.01); *B29K 2023/06* (2013.01); *B29K 2507/04* (2013.01); *B29K 2995/0005* (2013.01); *C08L 2203/18* (2013.01); *C08L 2205/025* (2013.01); *C08L 2205/06* (2013.01); *C08L 2310/00* (2013.01)

(58) Field of Classification Search
CPC ....... H01B 1/24; C08L 23/06; B29C 45/0001; B29C 48/022
See application file for complete search history.

(56) References Cited

U.S. PATENT DOCUMENTS

| | | | |
|---|---|---|---|
| 2008/0318015 A1 | 12/2008 | Stephenne et al. | |
| 2014/0001415 A1* | 1/2014 | Sheng ..................... | B29C 48/04 252/511 |
| 2014/0364545 A1 | 12/2014 | Prachoomdang et al. | |

FOREIGN PATENT DOCUMENTS

| | | |
|---|---|---|
| EP | 1189781 B1 | 5/2004 |
| EP | 1845124 A1 | 10/2007 |
| WO | 2011107495 A1 | 9/2011 |

OTHER PUBLICATIONS

Jang et al "Processing of nanographene platelets (NGPs) and NGP nanocomposites: a review", J. Mater Sci (2008) 43:5092-5101.*
Narita et al "New advances in nanographene chemistry", Chem. Soc. Rev., 2015, 44, 6616.*
International Search Report issued in Application No. PCT/EP2018/077043, dated Dec. 7, 2018; 4 pages.
G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, n° 4, 1977, p. 773-778.
Plastics Additives Handbook, ed. H. Zweifel, 5th edition, 2001, Hanser Publishers.

* cited by examiner

*Primary Examiner* — Mark Kopec
(74) *Attorney, Agent, or Firm* — Albert Shung

(57) ABSTRACT

The invention relates to a conductive article made from a composite material comprising:
  from 50 to 99 wt % of a first polyethylene resin as based on the total weight of said composite material, wherein the first polyethylene resin has a melt index MI2 of at most 0.45 g/10 min as determined according to ISO 1133 (190° C.—2.16 kg), and a density ranging from 0.920 g/cm$^3$ to 0.980 g/cm$^3$ as determined according to ISO 1183 at a temperature of 23° C.; and
  from 0.2 to 10 wt % of carbon particles as based on the total weight of said composite material as determined according to ISO 11358 selected from nanographene, carbon nanotubes or any combination thereof;
wherein the composite material further comprises from 0.10 to 0.48 wt % of polyethylene glycol as based on the total weight of the composite material, and in that said polyethylene glycol is selected to have a weight average molecular weight Mw of at most 20,000 g/mol. The invention also relates to a process to produce such conductive article as well as to the use of polyethylene glycol such a conductive article.

12 Claims, No Drawings

CONDUCTIVE ARTICLES PRODUCED FROM A COMPOSITE MATERIAL AND PROCESS TO PRODUCE SUCH ARTICLES

CROSS-REFERENCE TO RELATED APPLICATIONS

This application claims the benefit of PCT/EP2018/077043 filed Oct. 4, 2018, which claims priority from EO 17195318.5 filed Oct. 6, 2017, which are incorporated herein by reference in their entireties for all purposes.

FIELD OF THE INVENTION

The present invention relates to conductive articles made from polyethylene compositions such as pipes that can be used in mining applications, geomembrane or containers such as car fuel tank. The invention also relates to a process for the preparation of such conductive articles.

BACKGROUND OF THE INVENTION

Polymer materials, such as polyethylene (PE), are frequently used for preparing pipes suitable for various purposes, such as fluid transport, i.e. transport of liquid or gas, e.g. water or natural gas, during which the fluid can be pressurized.

PE pipes are generally manufactured by extrusion, or by injection moulding. The properties of such conventional PE pipes are sufficient for many purposes, although enhanced properties may be desired, for instance in applications requiring high-pressure resistance, i.e. pipes that are subjected to an internal fluid pressure for a long and/or a short period of time.

According to ISO 9080, PE pipes are classified by their minimum required strength, i.e. their capability to withstand different hydrostatic (hoop) stress during 50 years at 20° C. without fracturing. Thereby, pipes withstanding a hoop stress of 8.0 MPa (minimum required strength MRS8.0) are classified as PE80 pipes, and pipes withstanding a hoop stress of 10.0 MPa (MRS10.0) are classified as PE100 pipes.

Moreover, the transported fluid may have varying temperatures, thus according to ISO 24033, polyethylene of raised temperature resistance (PE-RT) pipes of type II shall not give any brittle failures indicating the presence of a knee at any temperature up to 110° C. within one year.

PE80 pipes, PE100 pipes and PE-RT pipes are usually prepared from specific polyethylene grades, such as medium density polyethylene and high-density polyethylene. PE80 pipes and PE100 pipes are usually produced from a polyethylene resin showing a high viscosity and having, therefore, a melt index MI5 of at most 1.5 g/10 min as determined according to ISO 1133 at 190° C. under a load of 5 kg. PE-RT pipes are usually produced from a polyethylene resin having a melt index MI2 of at most 5.0 g/10 min as determined according to ISO 1133 at 190° C. under a load of 2.16 kg.

If conductive pipes are required, such as for mining application, the polyethylene can be then blended with carbon particles such as carbon black. It has been experienced that, in order to achieve the desired electrical properties on the surface of the pipes, the composite material comprising the polyethylene and the carbon particles should contain at least 15 wt % of carbon particles as based on the total weight of the composite material. Unfortunately, the carbon particles content directly influences the mechanical properties obtained on the pipe such as the impact failure properties. As a general rule, when a polyethylene is blended with a filler (such as carbon black) the higher is the filler content, the worse are the impact properties.

Similar problems arise with containers such as car fuel tank (CFT) or with geomembrane when produced from polyethylene. PE-CFT are usually prepared from polyethylene, such as medium density polyethylene and high density polyethylene, having a high viscosity and therefore a high load melt index HLMI of at most 10 g/10 min as determined according to ISO 1133 at 190° C. under a load of 21.6 kg. The addition of carbon particles to achieve targeted electrical properties results in a loss of mechanical properties such as a loss of the impact properties.

Thus, there is a need for a solution to achieve good electrical properties (such as good surface resistance) in conductive articles, such as pipes, geomembranes or containers, while keeping at the same time good mechanical properties and in particular good impact properties.

SUMMARY OF THE INVENTION

It is therefore an object of the present invention to provide conductive articles, such as pipes suitable for mining applications, geomembranes or containers such as car fuel tanks, the articles having good mechanical properties and being conductive or at least dissipative, wherein the articles are produced from a composite material comprising a polyethylene and a low content of carbon particles such as nanographenes or carbon nanotubes (CNT). It is another object of the present invention to provide conductive articles, such as pipes suitable for mining applications, geomembranes or car fuel tanks, the articles having good mechanical properties and being conductive or at least dissipative. It is also an object of the invention to provide a process to produce said articles having good mechanical properties and being conductive or at least dissipative wherein the articles are made from a composite material having a low content of carbon particles.

According to a first aspect, the invention relates to a conductive article made from a composite material comprising:
- from 50 to 99 wt % of a first polyethylene resin as based on the total weight of said composite material, wherein the first polyethylene resin has a melt index MI2 of at most 0.45 g/10 min as determined according to ISO 1133 at 190° C. under a load of 2.16 kg, and a density of at least 0.920 g/cm$^3$ and of at most 0.980 g/cm$^3$ as determined according to ISO 1183 at a temperature of 23° C.; and
- from 0.2 to 10 wt % of carbon particles as based on the total weight of said composite material as determined according to ISO 11358 selected from nanographene, carbon nanotubes or any combination thereof;

wherein the composite material further comprises from 0.10 to 0.48 wt % of polyethylene glycol as based on the total weight of the composite material, and in that said polyethylene glycol is selected to have a weight average molecular weight Mw of at most 20,000 g/mol.

Surprisingly, it has been found by the inventors that the addition of polyethylene glycol (PEG) within the composite material allows at similar CNT and/or nanographenes content, better electrical properties compared to articles produced without said PEG. The addition of PEG allows reducing the content of carbon particles within the composite material as compared to a composite material comprising processing aids or being devoid of any processing aids. It is, therefore, possible to achieve the targeted electrical properties, for example on pipes, with a CNT content as low as less than 3 wt %. As the impact properties are directly influenced by the filler content, the invention provides conductive articles with an improved balance of electrical and mechanical properties. Moreover, as the content of carbon particles can be lowered, the invention results, for targeted electrical properties, in less expensive articles with better mechanical properties.

Without being bound to a theory, it is believed that the high shear resulting from the contact of the extrusion or injection device with the viscous polyethylene results in the formation of carbon particles composition from the top surface of the article produced up to the centre, such that an insulating layer with very few carbon particles can be found at the extreme surface of the article. Surprisingly, it seems that PEG having a molecular weight of less than 20,000 g/mol, have a good affinity with carbon particles and migrate with them to the top surface of the article, allowing the creation of a carbon particles pattern at the surface of the article.

With preference one or more of the following embodiments can be used to define the inventive conductive article:
- The article has a surface resistance of at most $5 \cdot 10^6$ Ohm, preferably $1 \cdot 10^6$ Ohm as measured according to IEC 61340-4-1 with a SRM110 meter.
- The article is selected from pipes, geomembranes or containers such as car fuel tanks, preferably the article is a pipe.

With preference one or more of the following embodiments can be used to define the first polyethylene resin in the composite material of the inventive conductive article:
- The first polyethylene resin has a melt index MI2 of less than 0.45 g/10 min as determined according to ISO 1133 at 190° C. under a load of 2.16 kg, preferably of less than 0.40 g/10 min, more preferably of less than 0.35 g/10 min.
- The first polyethylene resin has a high load melt index HLMI of at most 60 g/10 min as determined according to ISO 1133 at 190° C. under a load of 21.6 kg, preferably of at most 50 g/10 min, more preferably of at most 20 g/10 min, even more preferably of at most 18 g/10 min, and most preferably of at most 14 g/10 min.
- The conductive article is a pipe and the first polyethylene resin has a high load melt index HLMI of at least 5 g/10 min as determined according to ISO 1133 at 190° C. under a load of 21.6 kg, preferably of at least 7 g/10 min.
- The conductive article is a pipe and the first polyethylene resin has a high load melt index HLMI of at most 100 g/10 min as determined according to ISO 1133 at 190° C. under a load of 21.6 kg, preferably of at most 60 g/10 min, more preferably of at most 50 g/10 min.
- The conductive article is a pipe and the first polyethylene resin has a melt index MI5 of at least 0.1 g/10 min as determined according to ISO 1133 at 190° C. under a load of 5 kg, preferably of at least 0.2 g/10 min.
- The conductive article is a pipe and the first polyethylene resin has a melt index MI5 of at most 5.0 g/10 min as determined according to ISO 1133 at 190° C. under a load of 5 kg, preferably of at most 2.0 g/10 min, more preferably of at most 1.5 g/10 min, even more preferably of at most 1.0 g/10 min, most preferably of at most 0.9 g/10 min, and even most preferably of at most 0.7 g/10 min.
- The conductive article is a container and the first polyethylene resin has a high load melt index HLMI of at least 5 g/10 min as determined according to ISO 1133 at 190° C. under a load of 21.6 kg, preferably of at least 6 g/10 min.
- The conductive article is a geomembrane and the first polyethylene resin has a high load melt index HLMI of at most 20 g/10 min as determined according to ISO 1133 at 190° C. under a load of 21.6 kg, preferably of at most 18 g/10 min, and more preferably of at most 15 g/10 min.
- The first polyethylene resin has a density of at least 0.920 g/cm$^3$ and of at most 0.960 g/cm$^3$ as determined according to ISO 1183 at a temperature of 23° C.
- The article is a pipe or a container, and the first polyethylene resin has a density of at least 0.930 g/cm$^3$ and of at most 0.960 g/cm$^3$ as determined according to ISO 1183 at a temperature of 23° C.
- The article is a geomembrane and the first polyethylene resin has a density of at least 0.920 g/cm$^3$ and of at most 0.945 g/cm$^3$ as determined according to ISO 1183 at a temperature of 23° C.
- The first polyethylene resin has a molecular weight distribution Mw/Mn of at least 2 and/or of at most 30, Mw being the weight average molecular weight and Mn being the number average molecular weight, preferably the first polyethylene resin has a molecular weight distribution Mw/Mn of at least 7 and/or of at most 25.
- The first polyethylene resin has a monomodal molecular weight distribution or a bimodal molecular weight distribution, preferably the first polyethylene resin has a bimodal molecular weight distribution.
- The first polyethylene resin is a polyethylene copolymer, which is a copolymer of ethylene and at least one $C_3$-$C_{20}$-alpha-olefin, preferably 1-hexene.
- The first polyethylene resin is a polyethylene copolymer and has a commoner content of at least 1 wt % and at most 5 wt % as based on the total weight of the polyethylene copolymer.
- The first polyethylene resin is a Ziegler-Natta catalyzed polyethylene resin, a chromium catalyzed resin or a single-site catalyst catalyzed resin. Preferably, the first polyethylene resin is a Ziegler-Natta catalyzed polyethylene resin.

With preference one or more of the following embodiments can be used to define carbon particles of the composite material of the inventive conductive article:
- The composite material comprises at least 0.2 wt % of carbon particles as based on the total weight of said composite material as determined according to ISO11358 selected from nanographenes, carbon nanotubes (CNT) or any combination thereof, preferably at least 0.5 wt %, more preferably at least 1.0 wt %, even more preferably at least 2.0 wt %; and most preferably of at least 2.6 wt %.
- The composite material comprises at most 9 wt % of carbon particles as based on the total weight of said composite material as determined according to ISO11358 selected from nanographenes, carbon nanotubes (CNT) or any combination thereof, preferably at most 8.5 wt %, and more preferably at most 8 wt %.
- The carbon particles are carbon nanotubes and the composite material comprises from 0.2 to 5.0 wt % of carbon particles as based on the total weight of the composite material as determined according to ISO11358, preferably the composite material comprises from 0.5 to 4.8 wt %, more preferably from 1.5 to 4.5 wt %, even more preferably from 1.8 to 4.2 wt %, most preferably from 2.0 to 4.0 wt %, and even most preferably at most 3.5 wt % or at most 3.0 wt %, or at most 2.9 wt % of carbon particles as based on the total weight of the composite material.

The carbon particles are carbon nanotubes having an average L/D ratio of at least 1000 and the composite material comprises from 0.2 to 5.0 wt % of carbon particles as based on the total weight of the composite material as determined according to ISO 11358, preferably the composite material comprises from 0.5 to 4.8 wt % of carbon particles.

The carbon particles are carbon nanotubes having an average L/D ratio of at most 500 and the composite material comprises from 1.0 to 5.0 wt % of carbon particles as based on the total weight of the composite material as determined according to ISO 11358, preferably the composite material comprises from 2.0 to 4.5 wt % of carbon particles.

The carbon particles are nanographenes and the composite material comprises from 5.0 to 10.0 wt % of carbon particles as based on the total weight of the composite material as determined according to ISO11358, preferably the composite material comprises from 6.0 to 9.0 wt % of carbon particles as based on the total weight of the composite material.

With preference one or more of the following embodiments can be used to define the polyethylene glycol of the composite material:

The polyethylene glycol has a weight average molecular weight Mw of at most 12,000 g/mol, preferably at most 10,000 g/mol, more preferably of at most 8,000 g/mol, even more preferably of at most 6,000 g/mol, and most preferably of at most 5,000 g/mol.

The polyethylene glycol has a weight average molecular weight Mw of at least 200 g/mol, preferably at least 400 g/mol, more preferably of at least 800 g/mol, even more preferably of at least 1,000 g/mol, most preferably of at least 2,000 g/mol and even most preferably of at least 3,000 g/mol.

The polyethylene glycol has a weight average molecular weight Mw of 4,000 g/mol (CAS number 25322-68-3).

In a preferred embodiment, the composite material further comprises from 0.01 to 0.48 wt % of a processing aid as based on the total weight of said composite material, wherein the processing aid is selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof.

With preference, the composite material further comprises from 0.01 to 0.48 wt % of a processing aid as based on the total weight of said composite material, wherein the processing aid is selected from oleamide, stearamide, behenamide, oleyl palmitamide, ethylene bis-oleamide, ethylene bis (stearamide) (EBS) and any mixture thereof.

Preferably, the polyethylene glycol and the one or more processing aids form an additive mixture, and the content of polyethylene glycol in the additive mixture is ranging from 50 wt % to 99 wt % as based on the total weight of the additive mixture, more preferably from 60 wt % to 90 wt %, more preferably from 65 wt % to 85 wt %.

Indeed, as it is shown in the examples, the addition of one or more processing aids further improve the electrical properties of the articles. However, best results are obtained when the additive mixture comprising the polyethylene glycol and the one or more processing aids comprises at least 50 wt % of polyethylene glycol.

According to a second aspect, the invention relates to a process to produce a conductive article as defined according to the first aspect of the invention, wherein the process comprises:

a. providing from 50 to 99 wt % of a first polyethylene resin as based on the total weight of said composite material, wherein the first polyethylene resin has a melt index MI2 of at most 0.45 g/10 min as determined according to ISO 1133 at 190° C. under a load of 2.16 kg, and a density of at least 0.920 g/cm$^3$ and of at most 0.980 g/cm$^3$ as determined according to ISO 1183 at a temperature of 23° C.;

b. providing from 0.2 to 10 wt % of carbon particles as based on the total weight of said composite material as determined according to ISO 11358 selected from nanographene, carbon nanotubes or any combination thereof, wherein the carbon particles are provided with a masterbatch comprising the blend of a second polyethylene resin and at least 5 wt % of carbon particles as based on the total weight of said masterbatch as determined according to ISO 11358; the masterbatch having a HLMI of at least 5 g/10 min and of at most 500 g/10 min as determined according to ISO 1133 at 190° C. under a load of 21.6 kg; and c. providing from 0.10 to 0.48 wt % of polyethylene glycol as based on the total weight of the composite material, and in that said polyethylene glycol is selected to have a weight average molecular weight Mw of at most 20,000 g/mol;

d. optionally, providing from 0.01 to 0.48 wt % of one or more processing aids as based on the total weight of said composite material, wherein the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof;

e. blending the first polyethylene resin with the carbon particles, the polyethylene glycol, and the optional processing aids; and f. forming an article by extrusion, injection moulding, or blow moulding.

In an embodiment, the polyethylene glycol and/or the optional one or more processing aids are provided with the masterbatch comprising the carbon particles so that step b) is conducted together with steps c) and/or d) in a single step.

With preference, the masterbatch is produced by blending together a second polyethylene resin having a melting temperature Tm as measured according to ISO 11357-3, carbon particles, optional polyethylene glycol and optional processing aids, in an extruder comprising a transport zone and a melting zone maintained at a temperature comprised between Tm+1° C. and Tm+50° C., preferably comprised between Tm+5° C. and Tm+30° C.

With preference, the step e) and the step f) are performed together in a single extrusion apparatus or in a single injection moulding apparatus. Thus, the different components of the composite material are dry blended together and directly provided to the extrusion apparatus or to the injection moulding apparatus. The different components of the composite material are not melt blended nor chopped into pellets before the shaping step (by extrusion or by injection) to form a pipe, a geomembrane or a container such as a car fuel tank.

According to a third aspect, the invention provides a masterbatch for use in a process according to the second aspect, in order to produce a conductive article according to the first aspect. The masterbatch is:

comprising the blend of a second polyethylene resin and at least 5 wt % of carbon particles as based on the total weight of said masterbatch as determined according to ISO 11358, the carbon particles being selected from nanographene, carbon nanotubes or any combination thereof; and having a HLMI of at least 5 g/10 min and of at most 500 g/10 min as determined according to ISO 1133 at 190° C. under a load of 21.6 kg;

the masterbatch being remarkable in that it further comprises from 0.1 to 20.0 wt % of polyethylene glycol as based on the total weight of the masterbatch, wherein the polyethylene glycol is selected to have a weight average molecular weight (Mw) of at most 20,000 g/mol.

In an embodiment, the masterbatch further comprises from 0.01 to 4.0 wt % of a processing aid as based on the total weight of the masterbatch, said processing aid being selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof; wherein the processing aid is added in the masterbatch pure or in the form of another masterbatch.

In a preferred embodiment, the masterbatch further comprises from 0.01 to 4.0 wt % of a processing aid based on the total weight of the masterbatch, said processing aid being selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof; and the polyethylene glycol and the one or more processing aids form an additive mixture, wherein the content of polyethylene glycol in the additive mixture is ranging from 50 wt % to 99 wt % as based on the total weight of the additive mixture, preferably from 60 wt % to 90 wt %.

Preferably, the second polyethylene resin has a melt flow index MI2 ranging from 5 to 250 g/10 min as measured according to ISO 1133 at 190° C. under a load of 2.16 kg.

In a preferred embodiment, the masterbatch comprises from 0.08 to 4.0 wt % of polyethylene glycol as based on the total weight of the masterbatch, wherein said polyethylene glycol is selected to have a molecular weight of at most 20,000 g/mol, preferably from 0.1 to 3.5 wt %, more preferably from 0.2 to 3.0 wt %, and even more preferably from 0.3 to 2.5 wt %.

With preference, the polyethylene glycol has a weight average molecular weight (Mw):
of at most 12,000 g/mol, preferably at most 10,000 g/mol, more preferably of at most 8,000 g/mol, even more preferably of at most 6,000 g/mol, and most preferably of at most 5,000 g/mol; and/or
of at least 200 g/mol, preferably at least 400 g/mol, more preferably of at least 800 g/mol, even more preferably of at least 1,000 g/mol, most preferably of at least 2,000 g/mol and even most preferably of at least 3,000 g/mol.

In a preferred embodiment, the polyethylene glycol has a weight average molecular weight (Mw) of 4,000 g/mol (CAS number 25322-68-3).

With preference, the masterbatch comprises both the polyethylene glycol and the one or more processing aids, wherein the polyethylene glycol and the one or more processing aids form an additive mixture, and further wherein the content of polyethylene glycol in the additive mixture is ranging from 50 wt % to 99 wt % as based on the total weight of the additive mixture, more preferably from 60 wt % to 90 wt %, more preferably from 65 wt % to 85 wt %.

According to a fourth aspect, the invention relates to the use of polyethylene glycol in a composite material used to produce a conductive article according to the first aspect, wherein the polyethylene glycol is selected to have a weight average molecular weight (Mw) of at most 20,000 g/mol.

According to a fifth aspect, the invention relates to the use of polyethylene glycol in a process according to the second aspect of the invention for producing a conductive article, wherein the polyethylene glycol is selected to have a weight average molecular weight (Mw) of at most 20,000 g/mol.

With preference, the use of the polyethylene glycol according to the fourth or to the fifth aspect includes the polyethylene glycol being part of an additive mixture, wherein said additive mixture further comprises one or more processing aids selected from the processing aid is selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof, and the content of polyethylene glycol in the additive mixture is ranging from 50 wt % to 99 wt % as based on the total weight of the additive mixture.

DETAILED DESCRIPTION OF THE INVENTION

For the purpose of the invention the following definitions are given:

As used herein, a "polymer" is a polymeric compound prepared by polymerizing monomers, whether of the same or a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerization of at least two different types of monomers. These generic terms include polymers prepared from two or more different types of monomers, e.g. terpolymers, tetrapolymers, etc.

As used herein, "blend", "polymer blend" and like terms refer to a composition of two or more compounds, for example, two or more polymers or one polymer with at least one other compound.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter-rotating screws, non-intermeshing co-rotating or counter-rotating screws, reciprocating screws, screws with pins, barrels with pins, rolls, rams, helical rotors, or combinations comprising at least one of the foregoing.

As used herein the terms "polyethylene" (PE) and "ethylene polymer" may be used synonymously. The term "polyethylene" encompasses homopolyethylene as well as copolymers of ethylene which can be derived from ethylene and a comonomer such as one or more selected from the group consisting of $C_3$-$C_{20}$-alpha-olefins, such as 1-butene, 1-propylene, 1-pentene, 1-hexene, 1-octene.

The term "polyethylene resin" as used herein refers to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin".

The term "fluff" or "powder" as used herein refers to polyethylene material with the hard catalyst particle at the core of each grain and is defined as the polymer material after it exits the polymerization reactor (or the final polymerization reactor in the case of multiple reactors connected in series).

Under normal production conditions in a plant, it is expected that the melt index (MI2, HLMI, MI5) will be different for the fluff than for the polyethylene resin. Under normal production conditions in a plant, it is expected that the density will be slightly different for the fluff, than for the polyethylene resin. Unless otherwise indicated, density and melt index for the polyethylene resin refer to the density and melt index as measured on the polyethylene resin as defined above. The density of the polyethylene resin refers to the polymer density as such, not including additives such as for example pigments unless otherwise stated.

The term "carbon particles" as used herein encompasses carbon nanotubes and nanographene but excludes carbon fibres.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The particular features, structures, characteristics or embodiments may be combined in any suitable manner, as would be apparent to a person skilled in the art from this disclosure, in one or more embodiments.

The Conductive Articles

The invention provides a conductive article wherein the article is made from a composite material comprising:
from 50 to 99 wt % of a first polyethylene resin as based on the total weight of said composite material, wherein the first polyethylene resin has a melt index MI2 of at most 0.45 g/10 min as determined according to ISO 1133 at 190° C. under a load of 2.16 kg, and a density of at least 0.920 g/cm$^3$ and of at most 0.980 g/cm$^3$ as determined according to ISO 1183 at a temperature of 23° C.; and
from 0.2 to 10 wt % of carbon particles as based on the total weight of said composite material as determined according to ISO 11358 selected from nanographene, carbon nanotubes or any combination thereof;
wherein the composite material further comprises from 0.10 to 0.48 wt % of polyethylene glycol as based on the total weight of the composite material, and in that said polyethylene glycol is selected to have a weight average molecular weight Mw of at most 20,000 g/mol.

The conductive articles according to the invention show a lower content of carbon particles than similar articles known from prior art. As the filler content is lower, the articles have a better balance of electrical and mechanical properties. Moreover, the low content of carbon particles makes them less expensive.

The articles are preferably selected from pipes, geomembranes or containers such as car fuel tanks.

The term "pipe" as used herein is meant to encompass pipes in the narrower sense, as well as supplementary parts like fittings, valves and all parts which are commonly necessary for e.g. a hot water piping system.

Pipes according to the invention also encompass single and multilayer pipes, where for example one or more of the layers is a metal layer and which may include an adhesive layer. Other constructions of pipes, e.g. corrugated pipes, are possible as well.

Should multilayered pipes or multilayered containers such as car fuel tanks be considered, the conductive layer made from the composite material is the inner and/or the outer layer. Should multilayered geomembranes be considered, the conductive layer made from the composite material is one or both of the surface layers.

In a preferred embodiment, the conductive article has a surface resistance lower than 5·10$^6$ Ohm, preferably lower than 1·10$^6$ Ohm as measured according to IEC 61340-4-1 with a SRM110 meter.

The First Polyethylene

The composite material comprises a first polyethylene resin which is selected to be suitable for the application considered (pipe, geomembrane or container such as car fuel tank).

Whatever the application considered, the first polyethylene resin has preferably a melt index MI2 of less than 0.45 g/10 min as determined according to ISO 1133 at 190° C. under a load of 2.16 kg, preferably of less than 0.40 g/10 min, more preferably of less than 0.35 g/10 min.

Whatever the application considered, the first polyethylene resin has preferably a high load melt index HLMI of at most 100 g/10 min as determined according to ISO 1133 at 190° C. under a load of 21.6 kg, preferably of at most 60 g/10 min, and more preferably of at most 50 g/10 min.

However, it is possible to further select more precisely the first polyethylene in accordance with the targeted application.

In a preferred embodiment, wherein the article is a pipe, the first polyethylene resin may be selected as follows:

Preferably, the first polyethylene resin has a high load melt index HLMI of at least 5 g/10 min as determined according to ISO 1133 at 190° C. under a load of 21.6 kg, preferably of at least 6 g/10 min, and more preferably of at least 7 g/10 min.

In order to achieve targeted mechanical properties, the first polyethylene resin may have a melt index MI5 of at least 0.1 g/10 min as determined according to ISO 1133 at 190° C. under a load of 5 kg, preferably of at least 0.2 g/10 min.

In an embodiment, the first polyethylene resin may have a melt index MI5 of at most 5.0 g/10 min as determined according to ISO 1133 at 190° C. under a load of 5 kg, preferably of at most 2.0 g/10 min, more preferably of at most 1.5 g/10 min, even more preferably of at most 1.0 g/10 min, most preferably of at most 0.9 g/10 min, and even most preferably of at most 0.7 g/10 min.

In embodiments requiring the first polyethylene to be of the PE80 grade or the PE100 grade the first polyethylene resin has preferably a high load melt index HLMI of at most 20 g/10 min as determined according to ISO 1133 at 190° C. under a load of 21.6 kg, preferably of at most 18 g/10 min, and more preferably of at most 14 g/10 min.

The first polyethylene resin may be any PE80 grade, PE100 grade or PE-RT grade commercially available.

In another embodiment, wherein the article is a container, the first polyethylene resin may be selected to have a high load melt index HLMI of at least 5 g/10 min as determined according to ISO 1133 at 190° C. under a load of 21.6 kg, preferably of at least 6 g/10 min.

The first polyethylene resin may be any blow moulding grade commercially available suitable to produce containers.

In another embodiment, wherein the article is a geomembrane the first polyethylene resin may be selected to have a high load melt index HLMI of at most 20 g/10 min as determined according to ISO 1133 at 190° C. under a load of 21.6 kg, preferably of at most 18 g/10 min, and more preferably of at most 15 g/10 min.

Whatever the article is (a geomembrane, a pipe or a container), the first polyethylene resin has preferably a density of at least 0.925 g/cm$^3$ as determined according to ISO 1183 at a temperature of 23° C., and preferably of at least 0.935 g/cm$^3$.

In an embodiment, the first polyethylene resin has preferably a density of at most 0.970 g/cm$^3$ as determined according to ISO 1183 at a temperature of 23° C., preferably of at most 0.960 g/cm$^3$ more preferably of at most 0.955 g/cm$^3$.

For pipe and container applications, the first polyethylene resin has preferably a density of at least 0.930 g/cm$^3$ and of at most 0.960 g/cm$^3$ as determined according to ISO 1183 at a temperature of 23° C. For geomembranes, the first polyethylene resin has a density of at least 0.920 g/cm$^3$ and of at most 0.945 g/cm$^3$ as determined according to ISO 1183 at a temperature of 23° C.

The first polyethylene resin may have a molecular weight distribution Mw/Mn of at least 2 and/or of at most 30, Mw being the weight average molecular weight and Mn being the number average molecular weight, preferably the first polyethylene resin has a molecular weight distribution Mw/Mn of at least 7 and/or of at most 25.

The first polyethylene resin has a monomodal molecular weight distribution or a bimodal molecular weight distribution, preferably the first polyethylene resin has a bimodal molecular weight distribution.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" refers to polyethylene having a distribution curve being the sum of two unimodal molecular weight distribution curves, and refers to a polyethylene product having two distinct but possibly overlapping populations of polyethylene macromolecules each having different weight average molecular weights. As used herein, the term "polyethylene with a multimodal molecular weight distribution" or "multimodal polyethylene" refers to polyethylene with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin of the article can have an "apparent monomodal" molecular weight distribution, which is a molecular weight distribution curve with a single peak and no shoulder. In an embodiment, said polyethylene resin having a multimodal, preferably bimodal, molecular weight distribution can be obtained by physically blending at least two polyethylene fractions. In a preferred embodiment, said polyethylene resin having a multimodal, preferably bimodal, molecular weight distribution can be obtained by chemical blending of at least two polyethylene fractions, for example by using at least 2 reactors connected in series.

The first polyethylene can be produced by polymerizing ethylene and one or more optional comonomers, optionally hydrogen, in the presence of a catalyst being a metallocene catalyst, a Ziegler-Natta catalyst or a chromium catalyst.

In an embodiment, the first polyethylene resin is a Ziegler-Natta catalyzed polyethylene resin, preferably having a bimodal molecular weight distribution.

In an embodiment the first polyethylene resin is a chromium catalyzed polyethylene resin, preferably having a monomodal molecular weight distribution.

The term "chromium catalysts" refers to catalysts obtained by deposition of chromium oxide on a support, e.g. a silica or aluminium support. Illustrative examples of chromium catalysts comprise but are not limited to $CrSiO_2$ or $CrAl_2O_3$.

In an embodiment, the first polyethylene resin is obtained in the presence of a single site catalyst, preferably a metallocene catalyst. Preferably the first polyethylene has a bimodal molecular weight distribution.

The first polyethylene resin may be a polyethylene copolymer, which is a copolymer of ethylene and at least one comonomer selected from $C_3$-$C_{20}$ alpha-olefin. As used herein, the term "comonomer" refers to olefin comonomers which are suitable for being polymerized with ethylene monomers. Comonomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is 1-hexene.

Where the first polyethylene resin is a polyethylene copolymer, it preferably has a commoner content of at least 1 wt % and at most 5 wt % as based on the total weight of the polyethylene copolymer.

Polyethylene resins suitable for the invention (such as pipe grades or blow moulding grades) are commercially available from TOTAL®. Non-limitative examples are:

a PE 80 pipe grade is available under the commercial denomination 3802 B. The resin 3802 B has a density of 0.948 g/cm$^3$, a melt index MI2 of 0.2 g/10 min as determined according to ISO 1133 at 190° C. under a load of 2.16 kg, and a melt index MI5 of 0.9 g/10 min as determined according to ISO 1133 at 190° C. under a load of 5 kg;

- a PE 100 pipe grade is available under the commercial denomination XSENE® XCS 50 ORANGE. This product has a density of 0.949 g/cm$^3$ and a melt index MI5 of 0.3 g/10 min as determined according to ISO 1133 at 190° C. under a load of 5 kg;
- a PE-RT pipe grade is available under the commercial denomination XRT 70. This product has a density of 0.947 g/cm$^3$ and a melt index MI5 of 0.7 g/10 min as determined according to ISO 1133 at 190° C. under a load of 5 kg;
- a blow moulding grade suitable for production of containers is available under the commercial denomination 51090. This product has a density of 0.950 g/cm$^3$ and a high load melt index HLMI of 7 g/10 min as determined according to ISO 1133 at 190° C. under a load of 21.6 kg;
- a blow moulding grade suitable for production of containers is available under the commercial denomination 53090. This product has a density of 0.953 g/cm$^3$ and a high load melt index HLMI of 9 g/10 min as determined according to ISO 1133 at 190° C. under a load of 21.6 kg.

The Carbon Particles

In all embodiments, the carbon particles of the composite material are a carbonaceous material. In a preferred embodiment, the carbon particles of the composite material are nanoparticles. The nanoparticles used in the present invention can generally be characterized by having a size from 1 to and 5 μm. In the case of, for example, nanotubes, this definition of size can be limited to two dimensions only, i.e. the third dimension may be outside of these limits. Preferably, the nanoparticles are selected from the group of carbon nanoparticles. In an embodiment, the nanoparticles are selected from the group comprising carbon nanotubes, carbon nanofibers, nanographene, nanographite, and blends thereof. Preferably, the nanoparticles are selected from the group comprising carbon nanotubes, carbon nanofibers, nanographenes and blends thereof. More preferred are carbon nanotubes, nanographene, and blends of these. Most preferred are carbon nanotubes.

The invention provides an article produced from a composite material having a reduced content of carbon particles compared to prior art. Thus preferably, the composite material comprises at most 9 wt % of carbon particles as based on the total weight of said composite material as determined according to ISO 11358 selected from nanographenes, carbon nanotubes (CNT) or any combination thereof, preferably at most 8.5 wt %, and more preferably at most 8 wt %.

With preference, the composite material comprises at least 0.2 wt % of carbon particles as based on the total weight of said composite material as determined according to ISO 11358 selected from nanographenes, carbon nanotubes (CNT) or any combination thereof, preferably at least 0.5 wt %, and more preferably at least 1.0 wt.

Should the carbon particles be nanographene, the composite material may advantageously comprise from 5 to 10 wt % of carbon particles as based on the total weight of the composite material as determined according to ISO 11358, preferably the composite material comprises from 6 to 9 wt % of nanographenes as based on the total weight of the composite material.

The content of carbon particles can be further lowered by selecting carbon nanotubes instead or in addition to nanographene.

In an embodiment, the carbon particles are carbon nanotubes and the composite material comprises from 0.2 to 5.0 wt % of carbon particles as based on the total weight of the composite material as determined according to ISO 11358, preferably the composite material comprises from 0.5 to 4.8 wt %, more preferably from 1.5 to 4.5 wt %, even more preferably from 1.8 to 4.2 wt %, most preferably from 2.0 to 4.0 wt %, and even most preferably at most 3.5 wt % or at most 3.0 wt %, or at most 2.9 wt % of carbon particles as based on the total weight of the composite material.

Suitable carbon nanotubes used in the present invention can generally be characterized by having a size from 1 nm to 5 μm, this definition of size can be limited to two dimensions only, i.e. the third dimension may be outside of these limits.

Suitable carbon nanotubes also referred to as "nanotubes" herein, can be cylindrical in shape and structurally related to fullerenes, an example of which is Buckminster fullerene ($C_{60}$). Suitable carbon nanotubes may be open or capped at their ends. The end cap may, for example, be a Buckminster-type fullerene hemisphere. Suitable carbon nanotubes used in the present invention can comprise more than 90%, more preferably more than 95%, even more preferably more than 99% and most preferably more than 99.9% of their total weight in carbon. However, minor amounts of other atoms may also be present.

Carbon nanotubes can exist as single-walled nanotubes (SWNT) and multi-walled nanotubes (MWNT), i.e. carbon nanotubes having one single wall and nanotubes having more than one wall, respectively. In single-walled carbon nanotubes a one atom thick sheet of atoms, for example, a one atom thick sheet of graphite (also called graphene), is rolled seamlessly to form a cylinder. Multi-walled carbon nanotubes consist of a number of such cylinders arranged concentrically. The arrangement, in multi-walled carbon nanotubes, can be described by the so-called Russian doll model, wherein a larger doll opens to reveal a smaller doll.

In an embodiment, the carbon nanotubes are single-walled nanotubes characterized by an outer diameter of at least 0.5 nm, more preferably of at least 1 nm, and most preferably of at least 2 nm. Preferably their outer diameter is at most 50 nm, more preferably at most 30 nm and most preferably at most 10 nm. Preferably, the length of single-walled nanotubes is at least 0.1 μm, more preferably at least 1 μm, even more preferably at least 10 μm. Preferably, their length is at most 50 μm, more preferably at most 25 μm.

In an embodiment, the carbon nanotubes are single-walled carbon nanotubes, preferably having an average L/D ratio of at least 1000.

In an embodiment, the carbon nanotubes are multi-walled carbon nanotubes, more preferably multi-walled carbon nanotubes having on average from 5 to 15 walls.

Multi-walled carbon nanotubes are preferably characterized by an outer diameter of at least 1 nm, more preferably of at least 2 nm, 4 nm, 6 nm or 8 nm, and most preferably of at least 9 nm. The preferred outer diameter is at most 100 nm, more preferably at most 80 nm, 60 nm or 40 nm, and most preferably at most 20 nm. Most preferably, the outer diameter is in the range from 10 nm to 20 nm. The preferred length of the multi-walled nanotubes is at least 50 nm, more preferably at least 75 nm, and most preferably at least 100 nm. In an embodiment, the multi-walled carbon nanotubes have an average outer diameter in the range from 10 nm to 20 nm or an average length in the range from 100 nm to 10 μm or both. In an embodiment, the average L/D ratio (length/diameter ratio) is at least 5, preferably at least 10, preferably at least 25, preferably at least 50, preferably at least 100, and more preferably higher than 100.

In an embodiment, the carbon nanotubes having an average L/D ratio of at least 1000 and the composite material comprises from 0.2 to 5.0 wt % of carbon particles as based on the total weight of the composite material as determined according to ISO 11358, preferably the composite material comprises from 0.5 to 4.8 wt %.

In another embodiment, the carbon particles are carbon nanotubes having an average L/D ratio of at most 500 and the composite material comprises from 1.0 to 5.0 wt % of carbon particles as based on the total weight of the composite material as determined according to ISO 11358, preferably the composite material comprises from 2.0 to 4.8 wt %, more preferably from 2.6 to 4.5 wt %, even more preferably from 2.8 to 4.2 wt %, and most preferably from 3.0 to 4.0 wt % of carbon particles as based on the total weight of the composite material.

Suitable carbon nanotubes to be used in the present invention can be prepared by any method known in the art. Non-limiting examples of commercially available multi-walled carbon nanotubes are Graphistrength™ 100, available from Arkema, Nanocyl™ NC 7000 available from Nanocyl, FloTube™ 9000 available from CNano Technology.

Nanocyl™ NC 7000 available from Nanocyl are carbon nanotubes having an average L/D ratio of at most 500.

The Polyethylene Glycol and the Optional Processinq Aids

In accordance with the invention, the composite material comprises from 0.10 to 0.48 wt % of polyethylene glycol as based on the total weight of the composite material, and in that said polyethylene glycol is selected to have a weight average molecular weight Mw of at most 20,000 g/mol.

The invention encompasses the embodiments wherein the polyethylene glycol in the composite material is a mixture of polyethylene glycol of different molecular weight. In such a case the molecular weight to be taken into consideration is the weight average molecular weight of the mixture.

In an embodiment, the polyethylene glycol has a weight average molecular weight Mw of at most 12,000 g/mol, preferably at most 10,000 g/mol, more preferably of at most 8,000 g/mol, even more preferably of at most 6,000 g/mol, and most preferably of at most 5,000 g/mol.

With preference, the polyethylene glycol has a weight average molecular weight Mw of at least 200 g/mol, preferably at least 400 g/mol, more preferably of at least 800 g/mol, even more preferably of at least 1,000 g/mol, most preferably of at least 2,000 g/mol and even most preferably of at least 3,000 g/mol.

In a preferred embodiment, the polyethylene glycol is selected to have a weight average molecular weight Mw of 4,000 g/mol (CAS number 25322-68-3).

With preference, the composite material comprises at least 0.15 wt % of polyethylene glycol as based on the total weight of the composite material, preferably at least 0.20 wt %, more preferably at least 0.25 wt % and even more preferably at least 0.30 wt %.

In an embodiment, the composite material comprises at most 0.45 wt % of polyethylene glycol as based on the total weight of the composite material, preferably at most 0.42 wt %.

In a preferred embodiment, the composite material further comprises from 0.01 to 0.48 wt % of one or more processing aid as based on the total weight of said composite material, wherein the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof.

Preferably, the one or more processing aids are selected from oleamide, stearamide, behenamide, oleyl palmitamide, ethylene bis-oleamide, ethylene bis (stearamide) (EBS) and any mixture thereof.

With preference, the composite material comprises at least 0.05 wt % of processing aids as based on the total weight of the composite material, preferably at least 0.10 wt %, more preferably at least 0.15 wt % and even more preferably at least 0.20 wt %.

In an embodiment, the composite material comprises at most 0.40 wt % of processing aids as based on the total weight of the composite material, preferably at most 0.35 wt %.

Preferably, the polyethylene glycol and the one or more processing aids form an additive mixture, and the content of polyethylene glycol in the additive mixture is ranging from 50 wt % to 99 wt % as based on the total weight of the additive mixture, more preferably from 60 wt % to 90 wt %, more preferably from 65 wt % to 85 wt %.

In all embodiments of the invention, the composite material may further comprise one or more additives different from the listed processing aids, the one or more additive being selected from the group comprising an antioxidant, an antiacid, a UV-absorber, an antistatic agent, a light stabilizing agent, an acid scavenger, a lubricant, a nucleating/clarifying agent, a colorant or a peroxide. An overview of suitable additives may be found in Plastics Additives Handbook, ed. H. Zweifel, 5$^{th}$ edition, 2001, Hanser Publishers, which is hereby incorporated by reference in its entirety.

In all embodiments of the invention, the composite material may comprise from 0% to 45% by weight of one or more filler based on the total weight of the composite material, preferably from 1% to 35% by weight. The one or more filler being selected from the group consisting of talc, calcium carbonate, calcium hydroxide, barium sulphate, mica, calcium silicate, clay, kaolin, silica, alumina, wollastonite, magnesium carbonate, magnesium hydroxide, titanium oxide, zinc oxide, zinc sulphate, natural fibres, glass fibres. With preference, the filler is talc.

The invention also encompasses the article as described herein wherein the composite material comprises from 0% to 10% by weight of at least one additive such as antioxidant, based on the total weight of the composite material. In a preferred embodiment, said composite material comprises less than 5% by weight of additive, based on the total weight of the composite material, for example from 0.1 to 3% by weight of additive, based on the total weight of the composite material.

In an embodiment, the composite material comprises an antioxidant. Suitable antioxidants include, for example, phenolic antioxidants such as pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), 3DL-alpha-tocopherol, 2,6-di-tert-butyl-4-methylphenol, dibutylhydroxyphenyl-propionic acid stearyl ester, 3,5-di-tert-butyl-4-hydroxyhydrocinnamic acid, 2,2'-methylenebis(6-tert-butyl-4-methylphenol), hexamethylene bis[3-(3,5-di-tert-butyl-4-hydroxyphenyl)propionate], benzenepropanamide, N,N'-1,6-hexanediyl bis[3,5-bis(1,1-dimethylethyl)-4-hydroxy] (Antioxidant 1098), Diethyl 3.5-Di-Tert-Butyl-4-Hydroxybenzyl Phosphonate, Calcium bis[monoethyl(3,5-di-tert-butyl-4-hydroxylbenzyl)phosphonate], Triethylene glycol bis(3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl) propionyloxy-1,1-dimethylethyl)-2,4,8,10-tetraoxaspiro[5.5]undecane, 1,3,5-trimethyl-2,4,6-tris(3,5-di-tert-butyl-4-hydroxybenzyl) benzene, 1,1,3-tris(2-methyl-4-hydroxy-5-tert-butylphenyl) butane, (2,4,6-trioxo-1,3,5-triazine-1,3,5 (2H,4H,6H)-triyl)triethylene tris[3-(3,5-di-tert-butyl-4-hydroxyphenyl)propionate], tris(3,5-di-tert-butyl-4-hydroxybenzyl) isocyanurate, Tris(4-tert-butyl-3-hydroxy-2,6-dimethylbenzyl) isocyanurate, ethylene bis[3,3-bis(3-tert-butyl-4-hydroxyphenyl) butyrate], and 2,6-bis[[3-(1,1-dimethylethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S), 2-Methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis(octylthio)-1,3, 5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl]methyl]butylmalonate, 2,4-di-tert-butylphenyl 3,5-di-tert-butyl-4-hydroxybenzoate, hexadecyl 3,5-di-tert-butyl-4-hydroxy-benzoate, 2-(1,1-dimethylethyl)-6-[[3-(1,1-dimethylethyl)-2-hydroxy-5-methylphenyl] methyl]-4-methylphenyl acrylate, and CAS 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS 68411-46-1 (Antioxidant 5057), and 4,4-bis(alpha,alpha-dimethylbenzyl)diphenylamine (Antioxidant KY 405). Preferably, the antioxidant is selected from pentaerythritol tetrakis[3-(3',5'-di-tert-butyl-4'-hydroxyphenyl) propionate] (herein referred to as Irganox 1010), tris(2,4-ditert-butylphenyl) phosphite (herein referred to as Irgafos 168), or a mixture thereof.

The process to produce the conductive article The invention also provides a process to produce the conductive article as described above.

The conductive article is being produced from a composite material and the process comprises the following steps:

a. providing from 50 to 99 wt % of a first polyethylene resin as based on the total weight of said composite material, wherein the first polyethylene resin has a melt index MI2 of at most 0.45 g/10 min as determined according to ISO 1133 at 190° C. under a load of 2.16 kg, and a density of at least 0.920 g/cm³ and of at most 0.980 g/cm³ as determined according to ISO 1183 at a temperature of 23° C.;

b. providing from 0.2 to 10 wt % of carbon particles as based on the total weight of said composite material as determined according to ISO 11358 selected from nanographene, carbon nanotubes or any combination thereof, wherein the carbon particles are provided with a masterbatch comprising the blend of a second polyethylene resin and at least 5 wt % of carbon particles as based on the total weight of said masterbatch as determined according to ISO 11358; the masterbatch having a HLMI of at least 5 g/10 min and of at most 500 g/10 min as determined according to ISO 1133 at 190° C. under a load of 21.6 kg; and c. providing from 0.10 to 0.48 wt % of polyethylene glycol based on the total weight of the composite material, and in that said polyethylene glycol is selected to have a weight average molecular weight Mw of at most 20,000 g/mol;

d. optionally, providing from 0.01 to 0.48 wt % of one or more processing aids as based on the total weight of said composite material, wherein the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof;

e. blending the first polyethylene resin with the carbon particles, the polyethylene glycol, and the optional processing aids; and f. forming an article by extrusion, injection moulding, or blow moulding.

With preference, the polyethylene glycol and/or the optional one or more processing aids are provided with the masterbatch comprising the carbon particles so that step b) is conducted together with steps c) and/or d) in a single step.

As used herein, the term "masterbatch" refers to concentrates of carbon particles (such as carbon nanotubes (CNT) or nanographene) and/or processing aids in a polymer, which are intended to be subsequently incorporated into another polymer miscible with the polymer already contained in the masterbatches. Use of masterbatches makes processes more easily adaptable to industrial scale, compared to direct incorporation of the carbon particles into the polyethylene composition. In accordance with the invention, two polymers are said miscible when they are of the same nature, for instance when both are polyethylene.

The polyethylene glycol and the optional processing aids can be added by any known method.

In an embodiment, the polyethylene glycol and/or the processing aids can be provided with a masterbatch.

In another embodiment, alternative or complementary to the preceding one, the polyethylene glycol and/or the optional processing aids are added pure in the extruder in the main feeder but it is preferably added via a side-feeder.

In all embodiments, the masterbatch preferably comprises the blend of a second polyethylene resin and from 5 to 25 wt % of carbon particles as based on the total weight of said masterbatch as determined according to ISO 11358, the carbon particles being selected from nanographene, carbon nanotubes or any combination thereof; preferably from 6 to 15 wt % of carbon particles.

With preference, the masterbatch is produced by blending together a second polyethylene resin having a melting temperature Tm as measured according to ISO 11357-3, carbon particles, optional polyethylene glycol and optional processing aids, in an extruder comprising a transport zone and a melting zone maintained at a temperature comprised between Tm+1° C. and Tm+50° C., preferably comprised between Tm+5° C. and Tm+30° C. Preferably, the second polyethylene resin has a melt flow index ranging from 5 to 250 g/10 min as measured according to ISO 1133 at 190° C. under a load of 2.16 kg.

In an embodiment, the process for the preparation of the masterbatch according to the present invention comprises the steps of:

i. providing carbon particles;

ii. providing a second polyethylene resin having a melting temperature, Tm, measured according to ISO 11357-3, and wherein said second polyethylene resin has a melt flow index preferably comprised between 5 and 250 g/10 min measured according to ISO 1133 at 190° C. under a load of 2.16 kg;

iii. blending together said carbon particles and said second polyethylene resin by extrusion in an extruder comprising a transport zone and a melting zone maintained at a temperature comprised between Tm+1° C. and Tm+50° C., preferably between Tm+5° C. and Tm+30° C.; and iv. forming a masterbatch through a die, said masterbatch, comprising at least 5 wt % of carbon particles based on the total weight of the masterbatch as determined according to ISO 11358, and having a high load melt index, HLMI, of from 2 g/10 min to 1000 g/10 min, preferably ranging from 10 to 1000 g/10 min, determined according to ISO 1133 at 190° C. under a load of 21.6 kg.

In a preferred embodiment, the process further comprises the step of blending, with the second polyethylene resin and the carbon particles in step iii, from 0.1 to 20.0 wt % of polyethylene glycol as based on the total weight of the masterbatch, preferably from 0.5 to 10.0 wt %, more preferably from 0.8 to 5.0 wt %, even more preferably from 1.0 to 4.0 wt %, most preferably from 1.2 to 3.0 wt % and even more preferably from 1.5 to 2.5 wt %, wherein the polyethylene glycol is selected to have a weight average molecular weight Mw of at most 20,000 g/mol.

In another embodiment, the process further comprises the step of blending, with the second polyethylene resin and the carbon particles in step iii, from 0.01 to 20 wt % one or more processing aids based on the total weight of the masterbatch, preferably from 0.01 to 10 wt %, more preferably from 0.01 to 4.0 wt %.

In a preferred embodiment, step iii is carried out on co-rotating twin-screw extruder at a screw speed of at least 300 rpm, preferably at least 500 rpm.

In a preferred embodiment, the temperature of the masterbatch at the extruder's outlet ranges from the crystallization temperature and the melting temperature of the masterbatch polymer.

In a preferred embodiment, the second polyethylene resin is a polyethylene homopolymer or a copolymer of ethylene with $C_3$-$C_{20}$ olefins; and the temperature within the transport and melting zone of the extruder, preferably over the entire length of the extruder, ranges from 140° C. to 180° C., preferably from 140° C. to 170° C., more preferably from 140° C. to 160° C., most preferably from 150° C. to 160° C. Preferably, the temperature of the masterbatch at the extruder's outlet may range from the crystallization temperature and the melting temperature of the polyethylene homopolymer or of the copolymer of ethylene with $C_3$-$C_{20}$ olefins.

A homopolymer according to this invention has less than 0.2 wt %, preferably less than 0.1 wt %, more preferably less than 0.05 wt % and most preferably less than 0.005 wt %, of alpha-olefins other than ethylene in the polymer. Most preferred, no other alpha-olefins are detectable. Accordingly, when the polyethylene of the invention is a homopolymer of ethylene, the comonomer content in the polyethylene is less than 0.2 wt %, more preferably less than 0.1 wt %, even more preferably less than 0.05 wt % and most preferably less than 0.005 wt % based on the total weight of the polyethylene.

Step e) of Forming an Article

With preference, in all embodiments, the step e) and the step f) are performed together in a single extrusion apparatus or in a single injection moulding apparatus. Thus, the different components of the composite material are dry blended together and directly provided to the extrusion apparatus or to the injection moulding apparatus. The different components of the composite material are not melt blended nor chopped into pellets before the shaping step (by extrusion or by injection) to form a pipe, a geomembrane or a container such as a container.

This embodiment encompasses cases wherein the carbon particles are provided with a masterbatch, so that the blending of the masterbatch with the first polyethylene resin and their shaping into a composite article is done in a single step and in a single extrusion or injection moulding device. The inventive process allows obtaining further enhanced electrical properties on the shaped article compared with processes comprising a first step of compounding the masterbatch with the first polyethylene resin to obtain a composition and a subsequent step of shaping the composition to form a shaped article.

Preferably, in step e) of the present process, the blending is a dry blending of the masterbatch and the first polymer.

Pipes according to the invention can be produced by first plasticizing the composite material, or its components, in an extruder at temperatures in the range of from 200° C. to 250° C. and then extruding it through an annular die and cooling it.

Preferably, step e) of the present process is carried out in a twin-screw extruder with a screw rotation speed comprised between 5 to 1000 rpm, preferably between 10 and 750 rpm, more preferably between 15 and 500 rpm, most preferably between 20 and 400 rpm, in particular between 25 and 300 rpm. Twin-screw extruders are preferred to carry out step e) of the present process since high shear stress is generated which favours the enhancement of the electrical properties.

The extruders for producing the pipes can be single screw extruders or twin-screw extruders or extruder cascades of homogenizing extruders (single-screw or twin-screw). To produce pellets from the fluff (when homogenizing and introducing the additives), a single-screw extruder can be used, preferably with an L/D ratio of 20 to 40, or twin-screw extruders, preferably with an L/D ratio of 20 to 40, preferably an extruder cascade is used. In some embodiments, supercritical $CO_2$ or water is used during extrusion to help homogenization.

Variations could be considered like the use of supercritical $CO_2$ to help homogenization, and use of water during extrusion. Optionally, a melt pump and/or a static mixer can be used additionally between the extruder and the ring die head. Ring-shaped dies with diameters ranging from approximately 16 to 2000 mm and even greater are possible.

The melt arriving from the extruder can be first distributed over an annular cross-section via conically arranged holes and then fed to the core/die combination via a coil distributor or screen. If necessary, restrictor rings or other structural elements for ensuring uniform melt flow may additionally be installed before the die outlet.

After leaving the annular die, the pipe can be taken off over a calibrating mandrel, usually accompanied by cooling of the pipe by air cooling and/or water cooling, optionally also with inner water cooling.

Conversion into container, such as car fuel tank, can be performed by blow-moulding processes or by injection processes.

The container according to the invention may be produced by the conventional blow moulding techniques from a suitable parison extruded from a die. The parison could be monolayer or a multilayer parison. In this latter case, the conductive layer described in this patent is put as external layers (inner and/or outer layers);

The injection processes, if considered, are similar to what is disclosed e.g. in EP1189781.

Geomembrane processes are described e.g. in US20080318015

The methods used to prepare geomembranes are either flat sheet extrusion or blown sheet extrusion. In both methods, the heart of the process is the extruder. Pellets are fed into the extruder typically by a screw system, then they are heated, placed under pressure and formed into a hot plastic mass before reaching the die. Once the components are in the hot plastic state, they can be formed either into a flat sheet by a dovetail die or into a cylindrical sheet that is subsequently cut and folded out into a flat sheet.

In the flat sheet extrusion process, the hot plastic mass is fed into a dovetail die and exits through a horizontal straight slit. Depending upon the width of the die, one or more extruders may be needed to feed the hot plastic mass into the die. High quality metal rollers placed in front of the slit are used to control the thickness and surface quality of the sheets. These rollers must be able to sustain pressure and temperature variations without deformation and they are connected to cooling liquids. The rollers are designed in order to control the sheet thickness to less than 3% variation over the whole width. A third roller may be used to further cool the sheet and to improve its surface finish. The surface finish of the sheet is directly proportional to the quality of the rollers' surface. The evenly cooled finished material is then fed over support rollers to be wrapped onto a core pipe and rolled up.

In the blown extrusion process the hot plastic mass is fed into a slowly rotating spiral die to produce a cylindrical sheet. Cooled air is blown into the centre of the cylinder creating a pressure sufficient to prevent its collapsing. The cylinder of sheeting is fed up vertically: it is then closed by being flattened over a series of rollers. After the cylinder is folded together, the sheet is cut and opened up to form a flat surface and then rolled up. The annular slit through which the cylinder sheet is formed is adjusted to control the sheet's thickness. Automatic thickness control is available in modern plants. Cooling is performed by the cool air blown into the centre of the cylinder and then during the rolling up process.

Coextrusion allows the combination of different materials into a single multi-layer sheet. If multilayer structures are considered, the conductive layer described in this patent is put as external layers (inner and/or outer layers).

The Masterbatch Comprising Polyethylene Qlycol

The invention provides a masterbatch for use in a process according to the invention, to produce the conductive article of the invention.

With preference, the polyethylene glycol is present in the masterbatch. The masterbatch comprises the blend of a second polyethylene resin and at least 5 wt % of carbon particles as based on the total weight of said masterbatch as determined according to ISO 11358, the carbon particles being selected from nanographene, carbon nanotubes or any combination thereof; the masterbatch having a HLMI of at least 5 g/10 min and of at most 500 g/10 min as determined according to ISO 1133 at 190° C. under a load of 21.6 kg; and from 0.1 to 20.0 wt % of polyethylene glycol as based on the total weight of the masterbatch, wherein the polyethylene glycol is selected to have a weight average molecular weight Mw of at most 20,000 g/mol.

The masterbatch optionally comprises from 0.01 to 4.0 wt % of a processing aid based on the total weight of the masterbatch, said processing aid being selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof; Preferably, the second polyethylene resin has a melt flow index MI2 ranging from 5 to 250 g/10 min as measured according to ISO 1133 at 190° C. under a load of 2.16 kg.

In a preferred embodiment, the masterbatch comprises from 0.5 to 10.0 wt % of polyethylene glycol as based on the total weight of the masterbatch, preferably from 0.8 to 5.0 wt %, more preferably from 1.0 to 4.0 wt %, even more preferably from 1.2 to 3.0 wt % and most preferably from 1.5 to 2.5 wt %.

With preference, the polyethylene glycol has a weight average molecular weight Mw:
  of at most 12,000 g/mol, preferably at most 10,000 g/mol, more preferably of at most 8,000 g/mol, even more preferably of at most 6,000 g/mol, and most preferably of at most 5,000 g/mol; and/or
  of at least 200 g/mol, preferably at least 400 g/mol, more preferably of at least 800 g/mol, even more preferably of at least 1,000 g/mol, most preferably of at least 2,000 g/mol and even most preferably of at least 3,000 g/mol.

In a preferred embodiment, the polyethylene glycol has a weight average molecular weight Mw of 4,000 g/mol (CAS number 25322-68-3).

With preference, the masterbatch comprises both the polyethylene glycol and the one or more processing aids, wherein the polyethylene glycol and the one or more processing aids form an additive mixture, and further wherein the content of polyethylene glycol in the additive mixture is ranging from 50 wt % to 99 wt % as based on the total weight of the additive mixture, preferably from 60 wt % to 90 wt %, more preferably from 65 wt % to 85 wt %.

Test Methods

The melt flow index ($MI2_{PE}$) of the polyethylene is determined according to ISO 1133 at 190° C. under a load of 2.16 kg.

The melt flow index ($MI5_{PE}$) of the polyethylene is determined according to ISO 1133 at 190° C. under a load of 5 kg.

The high load melt flow index (HLMI) of the polyethylene is determined according to ISO 1133 at 190° C. under a load of 21.6 kg.

Molecular weights are determined by Size Exclusion Chromatography (SEC) at high temperature (145° C.). A 10 mg polyethylene sample is dissolved at 160° C. in 10 mL of trichlorobenzene (technical grade) for 1 hour. Analytical conditions for the GPC-IR from Polymer Char are:
  Injection volume: +/−0.4 mL;
  Automatic sample preparation and injector temperature: 160° C.;
  Column temperature: 145° C.;
  Detector temperature: 160° C.;
  Column set: 2 Shodex AT-806MS and 1 Styragel HT6E;
  Flow rate: 1 mL/min;
  Detector: IR5 Infrared detector (2800-3000 cm$^{-1}$);
  Calibration: Narrow standards of polystyrene (commercially available);
  Calculation for polyethylene: Based on Mark-Houwink relation ($\log_{10}(M_{PE})$=0.965909 $\log_{10}(M_{PS})$−0.28264); cut off on the low molecular weight end at $M_{PE}$=1000.

The molecular weight averages used in establishing molecular weight/property relationships are the number average ($M_n$), weight average ($M_w$) and z average ($M_z$) molecular weight.

These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The Molecular Weight Distribution (MWD) is then Calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenise the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg to 600 mg of polymer are dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content of a polyethylene is determined by $^{13}$C-NMR analysis of pellets according to the method described by G. J. Ray et al. in Macromolecules, vol. 10, no 4, 1977, p. 773-778.

Melting temperatures Tm were determined according to ISO 3146 on a DSC Q2000 instrument by TA Instruments. To erase the thermal history the samples are first heated to 200° C. and kept at 200° C. for a period of 3 minutes. The reported melting temperatures Tm are then determined with heating and cooling rates of 20° C./min.

The density is determined according to ISO 1183 at a temperature of 23° C.

The content of carbon particles, such as carbon nanotubes in percentage by weight in blends (% CNT) can be determined by thermal gravimetric analysis (TGA) according to ISO 11358, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined as follows: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600° C., the gas was switched to air (100 ml/min), and the carbon oxidized, yielding to the carbon content of carbon nanotubes in the sample (% C-sample). The % C-sample value was the average of 3 measurements. The content of carbon nanotubes in % by weight in sample (% CNT) was then determined by dividing the carbon content of carbon nanotubes in % by weight in samples (% C-sample) by the carbon content of the carbon nanotubes in % by weight (% C-CNT) and multiplying by 100.

% CNT=% C-sample/% C-CNT*100

The surface resistance and resistivity (SR) of the article was measured by the following silver ink method using a 2410 SourceMeter® apparatus. Conditions which were used were those described in the CEI 60167 test methods. The surface resistivity (SR) was measured on the article. The resistance measurement was performed using an electrode system made of two conductive paint lines using silver ink and an adhesive mask presenting 2 parallel slits 25 mm long, 1 mm wide and 2 mm apart. The samples were conditioned at 23° C./50% RH for minimum 4 hours before running the test. The measure of the resistance in Ohm was reported to a square measurement area and expressed in Ohm/square using the following equation: SR=(R×L)/d, wherein: SR is the average resistance reported to a square measurement area, conventionally called surface resistivity (expressed in Ohm/sq), R is the average of the resistance measurements (Ohm), L is the paint line length (cm), d is the distance between the electrodes (cm). L=2 cm and d=0.2 cm and SR=R×10. The surface resistivity (SR) value was the average of 3 measurements.

Alternatively, surface resistance (Ohm) was measured according to IEC 61340-4-1 with a SRM110 meter. The SRM110 is a surface resistance tester. Its internal parallel electrodes comply with DIN EN 100 015/1. IEC electrodes were externally connected for tests according to IEC 61340-4-1.

The following non-limiting examples illustrate the invention

EXAMPLES

Example 1: Preparation of a Masterbatch Comprising Carbon Nanotubes

The carbon nanotubes used were multi-walled carbon nanotubes Nanocyl™ NC 7000, commercially available from Nanocyl. These CNTs have a surface area of 250-300 $m^2/g$ (measured by BET method), a carbon purity of about 90% by weight (measured by thermal gravimetric analysis), an average diameter of 9.5 nm and an average length of 1.5 µm (as measured by transmission electron microscopy).

The second polyethylene resin used was polyethylene PE2 with a melt flow index of 16 g/10 min as measured according to ISO 1133 H (190° C.-2.16 kg), a density of 0.935 g/cm$^3$ (ISO 1183) and a Tm of 125° C. (ISO 11357-3).

The masterbatch M1a was prepared by blending polyethylene PE2 and carbon nanotubes, using classical twin-screw extrusion process. Carbon nanotubes powder and polyethylene were introduced into the extruder such as to obtain a CNT content of about 10% by weight based on the total weight of the masterbatch. The masterbatch M1a was blended on Leitztriz co-rotating twin screw extruder with a L/D ratio of 52 (D=60), the barrel temperature was set at 90-100° C., to have a melt temperature of about 160° C.

M1b was produced in the same conditions except that the barrel temperature was slightly lower.

The properties of the polyethylene based masterbatches are provided in below table 1.

TABLE 1

Properties of the PE masterbatch

| PE Masterbatch | M1a | M1b |
| --- | --- | --- |
| PE2 (wt %) | 90 | 90 |
| PE2 MFI (g/10 min) | 16 | 16 |
| Processing aid (wt %) | — | — |
| CNT (wt %) | 10 | 10 |
| Screw speed (RPM) | 500 | 500 |
| Throughput (kg/h) | 150 | 150 |
| barrel temperature (° C.) | 90-100 | 80-95 |
| HLMI (g/10 min.) | 26.2 | 31.0 |
| Surface resistance[(1)], $R_s$ (Ohm) | $2.7 \times 10^0$ | $4.2 \times 10^0$ |
| Surface resistivity[(1)], $\rho_s$ (Ohm/sq) | $2.7 \times 10^1$ | $4.2 \times 10^1$ |

[(1)]as measured on compression moulded plaque/square from pellets according to ASTM D-257-07, the surface resistivity is done with an accuracy of +/−1.0 × 10$^1$. The silver ink method was used for determination of the surface resistance and resistivity.

Example 2: Production of Bars—Influence of the Additive Composition

The masterbatch M1a was dry blended with a first polyethylene resin PE1 and extruded to form a bar. Extrusion trials were conducted on Gottfert single-screw extruder with a rectangular die of 50×20 mm. The Gottfert single screw extruder had a screw diameter=30 mm, and a length/diameter ratio (L/D ratio) of 35. In all cases, the barrel temperature was 250° C., the screw speed was 120 rpm.

The first polyethylene resin used was polyethylene PE1 commercially available from Total under the tradename XRT 70. PE1 has an MI5 of 0.7 g/10 min as measured according to ISO 1133 (190° C.—5 kg), a density of 0.949 g/cm$^3$ (ISO 1183), a HLMI of 12 g/10 min as measured according to ISO 1133 (190° C.—21.6 kg).

The following samples have been tested and results are reported in the below table 2:

- Bar 1 is a comparative sample, wherein the composite material is devoid of polyethylene glycol and of processing aid.
- Bar 2 is a comparative sample using processing aid, the processing aid selected to produce the sample was Dynamar FX5922 commercially available from 3M.
- Bar 3 is a comparative sample using processing aid, the processing aid selected to produce the sample was behenamide. The behenamide (CAS number: 3061-75-4) was commercially available from CRODA under the commercial name Crodamide BR.
- Bar 4 is an inventive sample using polyethylene glycol (PEG). The PEG selected had a Mw of 4000 g/mol (CAS number: 25322-68-3) and is commercially available from ALFA AESAR.

In Bars 5 to 7, the additive used was a mixture of Polyethylene Glycol (PEG) and behenamide at different ratios. The PEG selected had a Mw of 4000 g/mol (CAS number: 25322-68-3) and is commercially available from ALFA AESAR. The behenamide (CAS number: 3061-75-4) was commercially available from CRODA under the commercial name Crodamide BR.

TABLE 2

Properties of the bars produced

| | Bar 1 | Bar 2 | Bar 3 | Bar 4 | Bar 5 | Bar 6 | Bar 7 |
| --- | --- | --- | --- | --- | --- | --- | --- |
| Masterbatch | M1a | M1a | M1a | M1a | M1a | M1a | M1a |
| Masterbatch (wt %) | 20 | 20 | 20 | 20 | 20 | 20 | 20 |
| PE1 (wt %) | 80 | 79.4 | 79.7 | 79.7 | 79.4 | 79.4 | 79.4 |
| PE1 MI2 (g/10 min) | 0.3 | 0.3 | 0.3 | 0.3 | 0.3 | 0.3 | 0.3 |
| PE1 MI5 (g/10 min) | 0.7 | 0.7 | 0.7 | 0.7 | 0.7 | 0.7 | 0.7 |
| Dynamar FX5922 (wt %) | — | 0.6 | — | — | — | — | — |
| PEG 4000 (wt %) | — | — | — | 0.3 | 0.3 | 0.4 | 0.5 |
| Behenamide (wt %) | — | — | 0.3 | — | 0.3 | 0.2 | 0.1 |
| CNT (wt %) | 2 | 2 | 2 | 2 | 2 | 2 | 2 |
| Screw speed (RPM) | 120 | 120 | 120 | 120 | 120 | 120 | 120 |
| barrel temperature (° C.) | 250 | 250 | 250 | 250 | 250 | 250 | 250 |
| Surface resistance [(1)] of the bar $\rho_s$ (Ohm) | $1 \times 10^{12}$ | $1 \times 10^7$ | $1 \times 10^{12}$ | $1 \times 10^6$ | $1 \times 10^6$ | $1 \times 10^5$ | $1 \times 10^8$ |

[(1)] Surface resistance was determined at 20° C. according to IEC 61340-4-1 with a SRM110 meter.

From the results, it can be seen a clear influence of the addition of a small quantity of PEG of low molecular weight on the surface resistance, as compared to the other additives tested on bars 1 to 3. The additive mixture between PEG and processing aids provides also good results as far as the content of PEG is below the threshold of 0.5 wt %.

The results showed that the ratio PEG/behenamide in the additive mixture has also an influence on the surface resistance achieved on the bars. An improvement, compared to the reference bar produced with processing aids, is obtained with an additive composition comprising ⅔ PEG and ⅓ behenamide.

It is to be noted that Dynamar FX5922 is an additive blend comprising from 60 to 70 wt % of polyethylene oxide (PEO) and from 25 to 35 wt % of vinylidene fluoride-hexafluoropropylene polymer.

PEG and PEO are both polyoxyethylenes differing from their molecular weight. Indeed, PEG refer to oligomers and polymers with a molecular weight below 20,000 g/mol, whereas PEO to polymers with a molecular weight above 20,000 g/mol. Comparison between bar 2 and bar 4 shows the improvement in using polyoxyethylenes having a molecular weight below 20,000 g/mol compared to polyoxyethylenes having a molecular weight above 20,000 g/mol as additives in the composite material.

Example 3: Production of Bars—Influence of the Additive Composition and of the CNT Content Further tests were conducted with Masterbatch M1a. The masterbatch M1a was dry blended with a first polyethylene resin PE1 and extruded to form a bar. Extrusion trials were conducted on Gottfert single-screw extruder with a rectangular die of 50×20 mm. The Gottfert single screw extruder had a screw diameter=30 mm, and a length/diameter ratio (L/D ratio) of 35. In all cases, the barrel temperature was 250° C., the screw speed was 120 rpm.

The first polyethylene resin used was polyethylene PE1 commercially available from Total under the tradename XRT 70. PE1 has an MI5 of 0.7 g/10 min as measured according to ISO 1133 (190° C.—5 kg), a density of 0.949 g/cm$^3$ (ISO 1183), a HLMI of 12 g/10 min as measured according to ISO 1133 (190° C.—21.6 kg).

The following samples have been tested and results are reported in the below table 2:

Bar 8 is a comparative sample with a CNT content of 2.0 wt %, the processing aid selected was Viton Z100 commercially available from the Chemours Company.

Bar 9 is a comparative sample with a CNT content of 2.5 wt %, the processing aid selected was Viton Z100 commercially available from the Chemours Company.

Bar 10 is a comparative sample with a CNT content of 2.0 wt %, the processing aid was a blend of PEO and behenamide. The PEO was POLYOX™ WSR-301 (molecular weight Mw 4,000,000 g/mol) commercially available from Dow®. The behenamide (CAS number: 3061-75-4) was commercially available from CRODA under the commercial name Crodamide BR.

Bar 11 is a comparative sample with a CNT content of 2.5 wt %, the processing aid was a blend of PEO and behenamide. The PEO was POLYOX™ WSR-301 (molecular weight 4,000,000 g/mol) commercially available from Dow®. The behenamide (CAS number: 3061-75-4) was commercially available from CRODA under the commercial name Crodamide BR.

Bar 12 is an inventive sample with a CNT content of 2.0 wt % (the sample Bar 6 was repeated), the processing aid was a blend of PEG and behenamide. The PEG selected had a Mw of 4000 g/mol (CAS number: 25322-68-3) and is commercially available from ALFA AESAR. The behenamide (CAS number: 3061-75-4) is commercially available from CRODA under the commercial name Crodamide BR.

Bar 13 is an inventive sample with a CNT content of 2.0 wt %, the processing aid was a blend of PEG and Ethylene-bis-stearamide (EBS). The PEG selected had a Mw of 4000 g/mol (CAS number: 25322-68-3) and is commercially available from ALFA AESAR. The EBS (CAS number: 110-30-5) is commercially available from CRODA under the commercial name Crodamide EBS.

TABLE 3

Properties of the bars produced

| | Bar 8 | Bar 9 | Bar 10 | Bar 11 | Bar 12 | Bar 13 |
|---|---|---|---|---|---|---|
| Masterbatch | M1a | M1a | M1a | M1a | M1a | M1a |
| Masterbatch (wt%) | 20 | 25 | 20 | 25 | 20 | 20 |
| PE1 (wt %) | 79.4 | 74.4 | 79.4 | 74.4 | 79.4 | 79.4 |
| PE1 MI2 (g/10 min) | 0.3 | 0.3 | 0.3 | 0.3 | 0.3 | 0.3 |
| Viton Z100 (%wt) | 0.6 | 0.6 | — | — | — | — |
| POLYOX ™ WSR-301 (% wt) | — | — | 0.4 | 0.4 | — | — |
| PEG (% wt) | — | — | — | — | 0.4 | 0.4 |
| Behenamide (% wt) | — | — | 0.2 | 0.2 | 0.2 | — |
| EBS (% wt) | — | — | — | — | — | 0.2 |
| Eurucamide (% wt) | — | — | — | — | — | — |
| CNT (wt %) | 2 | 2.5 | 2 | 2.5 | 2 | 2 |
| Screw speed (RPM) | 120 | 120 | 120 | 120 | 120 | 120 |
| barrel temperature (° C.) | 250 | 250 | 250 | 250 | 250 | 250 |
| Surface resistance[1] of the bar ρs (Ohm) | $1 \times 10^9$ | $1 \times 10^7$ | $1 \times 10^{12}$ | $1 \times 10^{11}$ | $1 \times 10^5$ | $1 \times 10^6$ |

[1]Surface resistance was determined at 20° C. according to IEC 61340-4-1 with a SRM110 meter.

It is to be noted that Ziton 100 is an additive blend comprising less than 50 wt % of polyethylene oxide (PEO) and more than 5 wt % of vinylidene fluoride-hexafluoropropylene polymer.

Example 4: Production of Pipes

Samples of pipes have been produced with masterbatch M1. Two different lots of masterbatches were used, M1a and M1b. Masterbatch M1a is the same that was used in examples 1, 2 and 3. Masterbatch M1b showed slightly lower electrical properties than M1a. Thus, to compensate, the content of CNT in the composite material has been increased from 2 to 2.5 wt %.

The masterbatches M1a or M1b were dry blended with a first polyethylene resin PE1 and extruded to form a pipe. The first polyethylene resin used was polyethylene PE1 with an MI5 of 0.3 g/10 min as measured according to ISO 1133 (190° C.—5 kg), a density of 0.949 g/cm$^3$ (ISO 1183), a HLMI of 12 g/10 min as measured according to ISO 1133 (190° C.—21.6 kg). In all cases, the temperature at the outlet was 235° C., the screw speed was 40 rpm, except for pipe 3. The results are provided in table 3.

Pipes 1, 5 and 6 were devoid of polyethylene glycol. Pipes 2 to 4 comprises polyethylene glycol:

Pipe 1 is a comparative sample using processing aids, the processing aid selected to produce the sample was Dynamar FX5922 commercially available from 3M.

In pipes 2 to 6, the additive used was a mixture of polyethylene glycol (PEG) and behenamide. The PEG selected had a Mw of 4000 g/mol (CAS number: 25322-68-3) and is commercially available from ALFA AESAR. The behenamide (CAS number: 3061-75-4) was commercially available from CRODA under the commercial name Crodamide BR.

Pipe 7 is a comparative sample using processing aids, the processing aid selected to produce the sample was Incroslip Q commercially available from Croda.

Pipe 8 is a comparative sample using processing aids, the processing aid selected to produce the sample was glycerol monostearate (GMS) (CAS number: 123-94-4).

Example 5: Influence of the Viscosity of the First Polyethylene

Extruded blends were prepared by mixing the masterbatch M1a with different polyethylene resins commercially available from Total, having different melt index, under the following procedure.

Dry-blend of 15% of masterbatch-CNT (M1a) and 85% PE resin were introduced in the feed zone through the hopper and then extruded on twin screw extruder (screw diameter 18 mm)) at a melt temperature of 230° C. (barrel temperature profile from the hopper to die: 220-230-230-230-220° C.) at 80 rpm screw speed and 2 kg/h throughput. No additives were added.

Surface resistivity was measured with resistance meter using silver ink electrodes painted on compressed molded plates (CMP) made from CPD pellets at 230° C. during 4 min then cooled down to 30° C. at 20° C./min. The results are reported on the below table 5.

TABLE 4

Properties of the pipes produced

|  | Pipe 1 | Pipe 2 | Pipe 3 | Pipe 4 | Pipe 5 | Pipe 6 | Pipe 7 | Pipe 8 |
|---|---|---|---|---|---|---|---|---|
| Masterbatch | M1a | M1a | M1b | M1b | M1b | M1b | M1b | M1b |
| Masterbatch (wt %) | 20 | 20 | 25 | 25 | 25 | 27.5 | 25 | 25 |
| PE1 (wt %) | 79.5 | 79.4 | 74.4 | 74.4 | 74.4 | 71.9 | 74.4 | 74.4 |
| PE1 MI2 (g/10 min) | 0.3 | 0.3 | 0.3 | 0.3 | 0.3 | 0.3 | 0.3 | 0.3 |
| Dynamar FX5922 (wt %) | 0.5 | — | — | — | — | — | — | — |
| PEG 4000 (wt %) | — | 0.4 | 0.4 | 0.4 | 0.4 | 0.4 | — | — |
| Behenamide (wt %) | — | 0.2 | 0.2 | 0.2 | 0.2 | 0.2 | — | — |
| Incroslip Q (wt %) | — | — | — | — | — | — | 0.60 | — |
| GMS (wt %) | — | — | — | — | — | — | — | 0.60 |
| CNT (wt %) | 2 | 2 | 2.5 | 2.5 | 2.5 | 2.75 | 2.5 | 2.5 |
| Screw speed (RPM) | 40 | 40 | 20 | 40 | 40 | 40 | 40 | 40 |
| Draw rate (m/min) | 1.5 | 1.5 | 1 | 1.4 | 1.8 | 1.2 | 2.4 | 1.8 |
| barrel temperature (° C.) | 235 | 235 | 235 | 235 | 235 | 235 | 235 | 235 |
| Surface resistance [1] of the bar ρs (Ohm) | $1 \times 10^{11}$ | $1 \times 10^{6}$ | $1 \times 10^{12}$ | $1 \times 10^{12}$ | $1 \times 10^{6}$ | $1 \times 10^{6}$ | $1 \times 10^{12}$ | $1 \times 10^{10}$ |

[1] Surface resistance was determined at 20° C. according to IEC 61340-4-1 with a SRM110 meter.

From the results, it can be seen that addition of PEG can allow achieving surface resistance $1 \cdot 10^6$ ohm/sq on pipes, with a CNT content below 3 wt %. Pipe 3 and 4 are comparative and produced with the masterbatch M1b. The results showed that initial failure to obtain the targeted resistance properties may be solved by adapting the processing conditions (screw speed and draw rate) or by increasing the CNT content.

TABLE 5

| Resin | MI2 of the resin before blending (190° C./2.16 kg) | MI5 of the resin before blending (190° C./5 kg) | HLMI of the resin before blending (190°/21.6 kg) | Density of the resin before blending | Surface resistivity [1] (Ohm/square) of the extruded blend |
|---|---|---|---|---|---|
| PE1 | 0.3 | 0.7 | 15 | 947 | $>1 \times 10^{10}$ |
| PE3 | 1 | Nd | 26 | 918 | $7 \times 10^{4}$ |
| PE4 | 1.2 | Nd | 33 | 956 | $2 \times 10^{4}$ |
| PE5 | 4 | Nd | 86 | 940 | $2 \times 10^{3}$ |

[1] as measured with the silver ink method on compressed molded square
Nd = not determined From the results, it can be seen the influence of the melt index of the polyethylene resin on the possibility to obtain surface resistivity of below 5×10$^6$.

The invention claimed is:

1. A conductive article made from a composite material comprising:
   from 50 to 99 wt % of a first polyethylene resin as based on the total weight of the composite material, wherein the first polyethylene resin has a melt index MI2 of at most 0.45 g/10 min as determined according to ISO 1133 at 190° C. under a load of 2.16 kg, and a density of at least 0.920 g/cm$^3$ and of at most 0.980 g/cm$^3$ as determined according to ISO 1183 at a temperature of 23° C.; and
   from 0.2 to 10 wt % of carbon particles as based on the total weight of the composite material as determined according to ISO 11358 selected from nanographene, carbon nanotubes or any combination thereof;
   characterized in that the composite material further comprises from 0.10 to 0.48 wt % of polyethylene glycol as based on the total weight of the composite material, and in that the polyethylene glycol is selected to have a weight average molecular weight Mw of at most 20,000 g/mol.

2. The conductive article of claim 1 wherein the article has a surface resistance of at most 5·10$^6$ Ohm as measured according to IEC 61340-4-1 with a SRM110 meter.

3. The conductive article of claim 1 wherein the polyethylene glycol has a weight average molecular weight Mw of at most 12,000 g/mol.

4. The conductive article of claim 1 wherein the composite material further comprises from 0.01 to 0.48 wt % of a processing aid as based on the total weight of the composite material, wherein the processing aid is selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof; with preference the processing aids is selected from oleamide, stearamide, behenamide, oleyl palmitamide, ethylene bis-oleamide, ethylene bis (stearamide) (EBS) and any mixture thereof.

5. The conductive article of claim 4 wherein the polyethylene glycol and the one or more processing aids form an additive mixture, and in that the content of polyethylene glycol in the additive mixture is ranging from 50 wt % to 99 wt % as based on the total weight of the additive mixture.

6. The conductive article of claim 1 wherein:
   the carbon particles are carbon nanotubes, and in that the composite material comprises from 0.2 to 5.0 wt % of carbon particles as based on the total weight of the composite material; or
   the carbon particles are nanographenes, and in that the composite material comprises from 5.0 to 10.0 wt % of carbon particles as based on the total weight of the composite material.

7. The conductive article of claim 1 wherein the first polyethylene resin has a melt index MI2 of less than 0.40 g/10 min as determined according to ISO 1133 at 190° C. under a load of 2.16 kg, and/or an HLMI of at most 60 g/10 min as determined according to ISO 1133 at 190° C. under a load of 21.6 kg.

8. The conductive article of claim 1 wherein the article comprises pipes, geomembranes or containers.

9. The conductive article of claim 1 wherein the article is a pipe and in that first polyethylene resin has a melt index MI5 of at least 0.1 g/10 min and of at most 5.0 g/10 min as determined according to ISO 1133 at 190° C. under a load of 5 kg.

10. The conductive article of claim 1 wherein the article is a container and the first polyethylene resin has a high load melt index HLMI of at least 5 g/10 min as determined according to ISO 1133 at 190° C. under a load of 21.6 kg.

11. A process to produce a conductive article from a composite material, the process comprising:
   a. providing from 50 to 99 wt % of a first polyethylene resin as based on the total weight of the composite material, wherein the first polyethylene resin has a melt index MI2 of at most 0.45 g/10 min as determined according to ISO 1133 at 190° C. under a load of 2.16 kg, and a density of at least 0.920 g/cm$^3$ and of at most 0.980 g/cm$^3$ as determined according to ISO 1183 at a temperature of 23° C.;
   b. providing from 0.2 to 10 wt % of carbon particles as based on the total weight of the composite material as determined according to ISO 11358 selected from nanographene, carbon nanotubes or any combination thereof, wherein the carbon particles are provided with a masterbatch comprising the blend of a second polyethylene resin and at least 5 wt % of carbon particles as based on the total weight of the masterbatch as determined according to ISO 11358; the masterbatch having a HLMI of at least 5 g/10 min and of at most 500 g/10 min as determined according to ISO 1133 at 190° C. under a load of 21.6 kg; and
   c. providing from 0.10 to 0.48 wt % of polyethylene glycol as based on the total weight of the composite material, and in that the polyethylene glycol is selected to have a weight average molecular weight Mw of at most 20,000 g/mol;
   d. optionally, providing from 0.01 to 0.48 wt % of one or more processing aids as based on the total weight of the composite material, wherein the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polysiloxanes, oleamide, stearamide, behenamide, oleyl palmitamide, ethylene bis-oleamide, ethylene bis (stearamide) (EBS) and any mixture thereof;
   e. blending the first polyethylene resin with the carbon particles, the polyethylene glycol, and the optional processing aids; and
   f. forming an article by extrusion, injection moulding, or blow moulding.

12. The process of claim 11 wherein the polyethylene glycol and/or the optional one or more processing aids are provided with the masterbatch comprising the carbon particles so that step b) is conducted together with steps c) and/or d) in a single step.

* * * * *